United States Patent [19]

Beaman

[11] 4,137,558
[45] Jan. 30, 1979

[54] INSTRUMENT PROBE ASSEMBLY HAVING CONTINUOUS PROBE INSULATION

[75] Inventor: Norman V. Beaman, La Habra, Calif.

[73] Assignee: Robertshaw Controls Company, Richmond, Va.

[21] Appl. No.: 758,195

[22] Filed: Jan. 10, 1977

[51] Int. Cl.² .............................................. H01G 7/00
[52] U.S. Cl. .................................. 361/284; 73/304 C; 174/151; 174/153 G; 361/278
[58] Field of Search ............... 361/278, 284, 307, 302; 73/304 C; 324/61 P; 174/151, 153 G, 65 SS

[56] References Cited

U.S. PATENT DOCUMENTS

| 2,724,736 | 11/1955 | Klumpp | 174/153 G |
| 3,843,832 | 10/1974 | Peterson | 361/284 X |
| 4,054,744 | 1/1977 | Beaman | 174/151 |

FOREIGN PATENT DOCUMENTS

| 1147290 | 6/1957 | France | 174/65 SS |
| 909817 | 11/1962 | United Kingdom | 361/307 |

Primary Examiner—E. A. Goldberg
Attorney, Agent, or Firm—Fulwider, Patton, Rieber, Lee & Utecht

[57] ABSTRACT

There is disclosed a probe assembly suitable for mounting in a pressure vessel and the like which has an elongated probe member with a continuous and unbroken insulation coating that is received within an assembly body. The latter has attachment means to secure the body in an aperture of a pressure vessel. The elongated probe member has an outwardly deflecting radial bend, and reverse and straightening radial bends which are received within and bear against supporting shoulders in the assembly body. The probe has its elongated portions projecting from opposite ends of the body, substantially coaxially. The aforedescribed construction securely retains the probe member within the assembly body, preventing its forced dislodgement therefrom under the pressure within the pressure vessel or misalignment during installation or use while, nevertheless, providing a continuous unbroken electrical insulation, thereby insuring against malfunctions that can occur when process fluids leak into the assembly body.

8 Claims, 5 Drawing Figures

INSTRUMENT PROBE ASSEMBLY HAVING CONTINUOUS PROBE INSULATION

REFERENCE TO RELATED PATENTS

My U.S. Pat. No. 4,054,744 issued Oct. 18, 1977, discloses and claims the use of a particular sealing sleeve on the process end of the probe assembly.

BACKGROUND OF THE INVENTION

1. Field of the Invention

This invention relates to an instrument probe assembly and, in particular, to a probe assembly useful for capacitance measurement detection of process variables such as liquid levels and the like.

2. Brief Statement of the Prior Art

Instrument probes such as elongated metal rods, often coated with a dielectric material, are commonly used for measurement of process variables such as the level of a liquid or granular solid within a containing vessel. The elongated probes have a metal core which is received within an assembly body that usually has a threaded gland portion and the like which is received within a nozzle or aperture of a pressure vessel. The probe member is secured within the assembly body and protected against dislodgement thererfrom by an annular retainer ring mounted in a peripheral groove in the portion of the probe member within the assembly body. Spacer ring of dielectric material are positioned on opposite faces of the retainer ring and the entire retainer portion of the probe member is encased within dielectric sleeves which are mounted within a cavity of the assembly body. While this construction adequately retains the probe member within the assembly, process fluids can invade the assembly body and destroy the electrical isolation of the probe member metal core. Additionally, the aforementioned construction employs a number of components which must be assembled, thereby contributing to a substantial intial cost of the assembly.

BRIEF STATEMENT OF THE INVENTION

This invention comprises an instrument probe assembly wherein the elongated probe member has a bent portion which is captured within the body of the probe assembly. The probe member bears a continuous and unbroken coating of a dielectric material, and process fluids which may invade the assembly body are, thus, electrically isolated from the metal core of the probe member. In the preferred construction, the assembly body has a through passageway defining the interior cavity and the communicating openings at opposite ends thereof are in substantial coaxial alignment. The elongated probe member, with its coating of dielectric material, is received within the through passageway. The received portion of the probe member has a first, radially deflected bend, and successive, reverse and straightening radial bends so that the opposite ends of the probe member project from opposite ends of the assembly body along the same general direction, preferably, coaxially. The body has shoulder means which serve as abutments to secure the probe against movement. The assembly body can be formed of first and second members with the second member recieved within an open-ended bore of the first member which has an annular lip that is rolled over an external annular shoulder of the second member. In the preferred embodiment, the body cavity receives a cylindrical core member having an external axial groove with a central high point and inclined distal ramps to support the bent portion of the elongated probe member.

BRIEF DESCRIPTION OF THE DRAWINGS

The invention will be described with reference to the figures of which.

DESCRIPTION OF THE PREFERRED EMBODIMENTS

Figure 1:
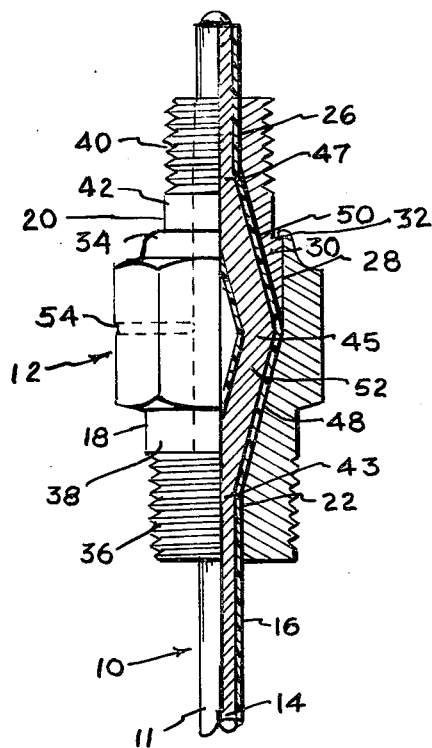
FIG. 1 is a partial sectional view of an embodiment of the invention.

Referring now to FIG. 1 the invention is disclosed as an instrument probe assembly of an elongated probe member 10 and an assembly body 12. The probe member 10 has a central core 14 of a suitable electrical conducting material, e.g., metal, and is covered by an unbroken and continuous coating 16 of a dielectric material.

The projecting portion 11 of probe 10, which projects into the process vessel, includes metal core 14 which can, optionally, be bare or can be covered with the dielectric material coating 16. In some applications, a concentric metal sheath can be installed over the exiting portion of the probe 10. The metal core 14 is the sensing electrode of the capacitance instrument.

The assembly body 12 is formed of a first member 18 and a second member 20. The first and second members have through openings 22 and 26, respectively, which define a continuous through passageway in the assembly body 12. The first member 18 has a large diameter counterbore 28 to receive the inboard end 30 of the second member 20. The received portion 30 of the second member 20 is of larger diameter to provide an external, annular shoulder 32 which is received within counterbore 28 and the thin peripheral lip 34 of the first member 18 is rolled about the shoulder 32, securing the assembly.

The first member 18 bears attachment means for removably securing the assembly body in the aperture of a process vessel such as a pressure vessel. The particular means illustrated comprises external pipe threads 36 on the gland portion 38 of first member 18. Similar attachment means in the form of external threads 40 can be provided on the shank portion 42 of the second member whereby an electrical junction box and the like can be mounted on this member.

In accordance with the invention, the elongated probe member 10 has a plurality of radial deflection bends 43, 45 and 47 in a bent portion 52 received within body 12. The deflection bend 43 radially deflects the probe member out of its longitudinal axis; bend 45 is a reversing bend, returning the probe member to its longitudinal axis and bend 47 is a straightening bend permitting the probe member to project in the same general direction, preferably coaxially, from opposite ends of the assembly body.

The first and second body members, 18 and 20, are milled to provide the radially inclined, longitudinal grooves 48 and 50 which serve as shoulder means that receive the deflected or bent portion 52 of the elongated probe member and that function as abutments to prevent axial and rotational movement of probe member 10 in body 12.

The radius of curvature and angle of deflection of the probe member bends 43, 45, and 47 are limited to avoid exceeding the elastic deformation and elongation limits of the dielectric material coating 16, thereby avoiding breaking of this coating. Typically, the bends have a radius of curvature greater than about 1/16th inch, preferably greater than about ⅜" and an angle of deflection no greater than about 45°, preferably less than about 30°. The illustrated bends have a radius of curvature of ⅜" and an angle of deflection of 15°.

The central cavity or through passageway of the assembly body can be provided with a port 54 which extends radially through the first body member 18, communicating with the central cavity and permitting drainage of any process fluids which enter this cavity.

Figure 3:
FIG. 3 is a view along lines 3—3 of FIG. 2.
Figure 2:
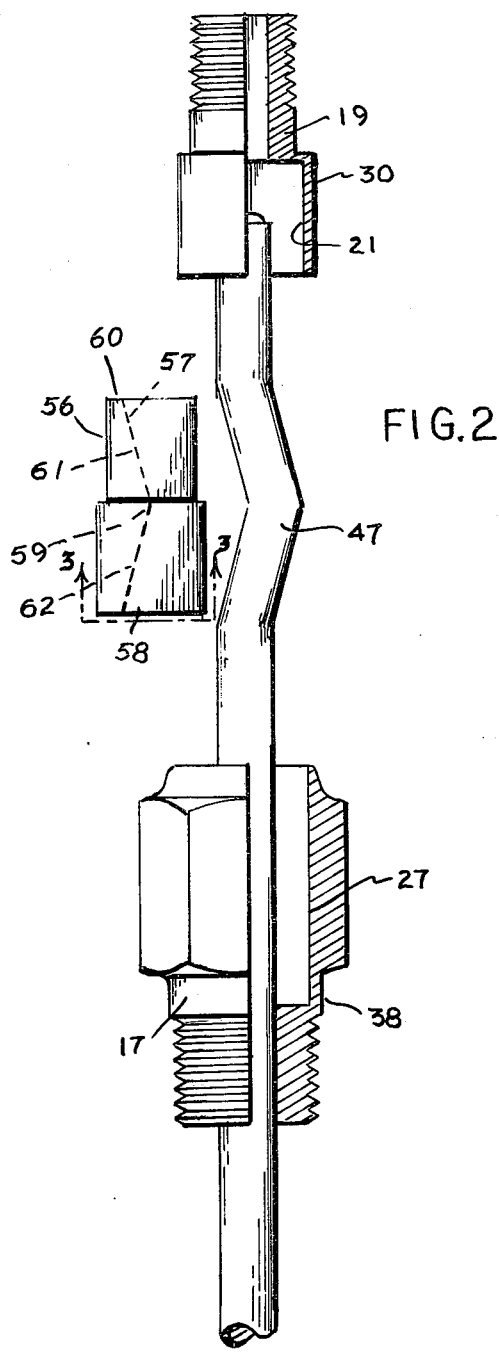
FIG. 2 is a partial sectional view of a preferred embodiment of the invention.

Referring now to FIGS. 2 and 3, a preferred construction of the assembly body is illustrated. The first body member 17 is provided with a substantially coextensive counterbore 27 that can extend into its gland portion 38. The second body member 19 also has a counterbore 21 in end portion 30 which is received within counterbore 27 of body member 17.

A generally cylindrical plug member 56 is provided with its opposite ends 58 and 60 of diameters to fit within respective counterbores 27 and 21. The plug member 56 has an axial, external groove 57 coextensive with its length. As apparent from FIG. 3, groove 57 has a high point 59 at its center with inclined, distal flights 61 and 62. Plug member 56 is received about the bent portion 52.

The remainder of the construction of the probe member assembly is the same as that shown in FIG. 1 and the identical elements have the same designation as previously described with regard to the FIG. 1 embodiment. The use of the plug member 56 is preferred since it greatly facilitates the manufacture by permitting milling of external grooves in member 56 rather than the more difficult machining of internal grooves 48 and 50, as in the FIG. 1 embodiment.

Various dielectric materials such as plastics can be used for the coatings 16, 68 and 72. Teflon, poly(tetrafluoroethylene) is a preferred material, particularly for use with viscous liquids, since it has a low surface adherability and excellent corrosion resistance. Other suitable plastics inlcude polyolefins, e.g., polyethylene. The thickness of the dielectric material coating can be varied, typically it can be from 1/64 to ½ inch, usually from 1/32 to ¼ inch. The diameter of metal rod 14 or 66 can be from 1/16 to 1 inch, and usually is from ¼ to about ½ inch. While various metals can be used, stainless and carbon steels and Monel or Hastelloy C alloys are commonly employed.

Figure 4:
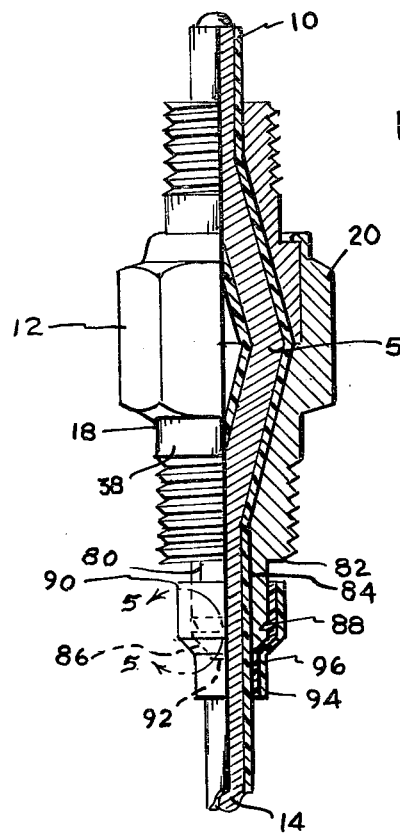
FIGS. 4 and 5 are views of an embodiment of the invention employing an improved probe-to-assembly body seal.
Figure 5:
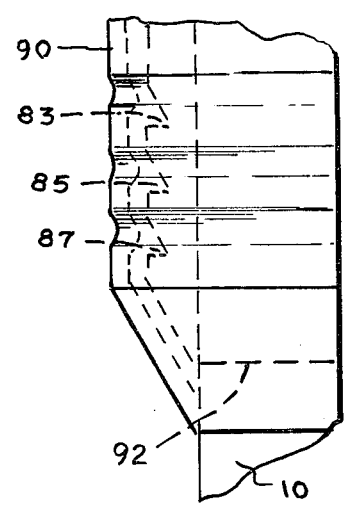

Referring now to FIG. 4, the embodiment of the invention is provided with additional sealing facilities. This construction employs an elongated probe member 10 and a second body member 12 which are identical to the elements previously described with regard to FIG. 1. The first body member 18 has the same gland portion 38 as in FIG. 1 and is additionally provided with a body sleeve 80 that projects from face 82 of gland portion 38. Body sleeve 80 has a central, through passageway 84 to receive elongated probe member 10 and has a bevelled distal edge 86. Preferably, the body sleeve 80 has peripheral groove means 88 near its upper edge.

A laminate sealing sleeve 90 of suitable plastics is fitted over the probe member 10 and body sleeve 80, overlying the annular joint 92 between these elements. The laminate sealing sleeve 90 comprises an outer casing 94 of a heat shrinkable plastic material and an inner sleeve 96 of a thermoplastic material. The sealing sleeve 90 is applied over joint 92 and contiguous portions of the probe member 10 and body sleeve 80 and is heated in this position to shrink the assembly into a very tight sealing engagement to the received members. The bevelled distal edge 86 of body sleeve 80 facilitates the accomodation of the sealing sleeve 90 to the assembly by avoiding any sharp corners and the like which could cause sealing problems or undue stress on the sealing sleeve 90. The peripheral groove means 88 is, preferably, a plurality of tapered grooves 83, 85 and 87 which have a sharp trailing edge and an inclined sidewall to permit entrusion of the thermoplastic material 96 during the thermal application of the sealing sleeve.

The heating of the sealing sleeve 90 after its application is sufficient to soften or melt the thermoplastic material of the inner sleeve 96 such that the simultaneous shrinking of heat shrinkable casing 94 will cause the thermoplastic material to deform closely to the contour of the received elements, intruding into the grooves 83, 85 and 87 (see FIG. 6) to provide a very tight and secure seal.

The sealing sleeve 90 is preferably formed of chemically inert plastics such as various halogenated polymers. A preferred sleeve is commercially available under the name Penntube WTF from Penntube Plastics Inc., Madison Avenue and Holly Street, Clifton Heights, Pennsylvania. This product has an outer sheath formed of heat shrinkable Teflon TFE with the inner sleeve formed of thermoplastic FEP. Teflon TFE is, of course, poly(tetrafluoroethylene), a chemical renowned for its chemical inertness. The FEP resin used for the inner sleeve 96 is a copolymer of tetrafluoroethylene and hexafluoropropylene wherein the hexafluoropropylene monomeric units are inserted along the poly(tetrafluoroethylene) chain, the dependent trifluoromethylene groups functioning to provide a lower melting temperature and low viscosity to this polymer than those of the Teflon TEF resin employed for the heat shrinkable outer sleeve 94.

The sealing means of the assembly of the invention provide substantially complete insurance against invasion of process fluids into the cavity of the assembly body 12. The gland end 38 of the assembly body is turned into an internally threaded nozzle of a pressure vessel and the sleeve 80 with its dependent sealing sleeve 90 projects from the nozzle, interiorly of the vessel. In this deployment, the sealing sleeve 90 is surrounded by the high pressure process fluids and the sealing sleeve is compressed against the faces of the received elements with ever increasing force as the interior pressure of the vessel increases.

The tapered distal edge 86 of the body sleeve 80 cooperates to insure continuity of the sealing sleeve 90. The contour of this distal portion provides for a gradual transition from the lesser diameter probe member 10 to the larger diameter of body sleeve 80 without providing any regions of stress concentration of sealing sleeve 90 at its most acute location, i.e., in the vicinity of the annular line joint 92 between these elements.

The projectile curb means of the instrument assembly, i.e., bent portion 52, received with the assembly body 12, likewise provides an assembly of improved characteristics. The bent portion 52 insures against the forced ejection of the probe member 10 from the assembly 12 under the superatmospheric pressures encountered within a process vessel. The bent portion 52 also provides torsional engagement of probe 10, thereby securing the probe against twisting or turning in the assembly body. This prevents incorrect alignment of the probe in the process vessel during its installation and twisting of the probe during use.

In contrast to various prior art retainer rings and the like, the probe 10 in the assembly of this invention bears a continuous or unbroken coating of dielectric material coextensive with the entire length of probe member 10 received within the housing body 12. This construction avoids essentially all possibility of unintentional electrical grounding between the metal sensing core 14 and the body 12 of the assembly. In the event that process fluids may invade the cavity of the assembly body under the superatmospheric pressures that can be encountered by the assembly, the exposure of bent portion 52 of the probe 10 to such received fluids will not present any more severe exposure than encountered by the projecting portion 11 of the probe member, since the bent portion 52 is, likewise, entirely encased within an unbroken coating of dielectric material.

The invention has been described with reference to the illustrated, presently preferred embodiment thereof. It is not intended that the invention be unduly limited by this description of the illustrated, preferred embodiment. Instead, it is intended that the invention be defined by the means and their obvious equivalents set forth in the following claims.

What is claimed is:

1. A probe assembly for mounting in an aperture in the wall of a vessel which comprises:
    a. a body having attachment means at one end for securing to said aperture;
    b. a through passageway in said body opening to said one end thereof and, substantially coaxially, to the opposite end thereof;
    c. an elongated metal solid core, single rod probe member received within said passageway extending through said body and projecting, from said one end whereby said member projects into said vessel when said assembly is mounted in said aperture;
    d. a continuous insulating coating coextensive with said probe member;
    e. a preformed radial deflection bend in the received portion of said probe member within said housing, a successive, reverse radial deflection bend and a straightening bend in said received portion of said probe member, said deflection bends being limited in angle and radius to avoid fractures in said continuous coating;
    f. preformed internal shoulder means within said body having an axial groove with a radially offset center and radially inclined shoulders to receive said bends of said probe member and provide continuous abutments therefor, preventing axial and rotational movement of said probe member in said body.

2. The probe assembly of claim 1 wherein said body is formed with a central, enlarged diameter cavity.

3. The probe assembly of claim 1 wherein said body is formed by a first body member having a central, enlarged diameter cavity and a second body member received therein.

4. The probe assembly of claim 3 wherein said second body member has an external, annular shoulder and said first body member has an annular lip received about and rolled over said annular shoulder, thereby securing the assembly.

5. The probe assembly of claim 3 including a cylindrical core received within said cavity and bearing an axial groove having a radially high center and radially inclined distal shoulders to receive said bent portion of said probe member.

6. A probe assembly for mounting in an aperture in the wall of the vessel which comprises:
    a. body housing formed of a first body member having a central, enlarged diameter cavity and a second body member having an external, annular shoulder received within said central cavity and secured thereto by an annular lip of said first body rolled over said annular shoulder; said first and second body members having axial bores aligned in said assembly to define a through passageway communicating with said central cavity;
    b. an enlarged, rigid metal core probe member received in said through passageway of said housing and projecting from opposite ends thereof;
    c. a continuous, insulating coating co-extensive with said probe member;
    d. a preformed radial deflection bend in the received portion of said probe member within said housing, a successive reverse radial deflection bend and a straightening bend in said received portion of said probe member, said deflection bends limited in angle and radius to avoid fractures in said continuous coating; and
    e. a cylindrical core received within said central cavity and bearing an axial groove having a radially high center and radially inclined distal shoulders to receive said bends of said probe member and provide continuous abutments therefor, preventing axial and rotational movement of said probe member in said body.

7. The probe assembly of claim 6, wherein said housing bears threaded neck portions for removable detachment in internally threaded apertures.

8. The probe assembly of claim 6, wherein said rod and insulation coating together comprise a capacitance probe member.

* * * * *